No. 765,405. Patented July 19, 1904.

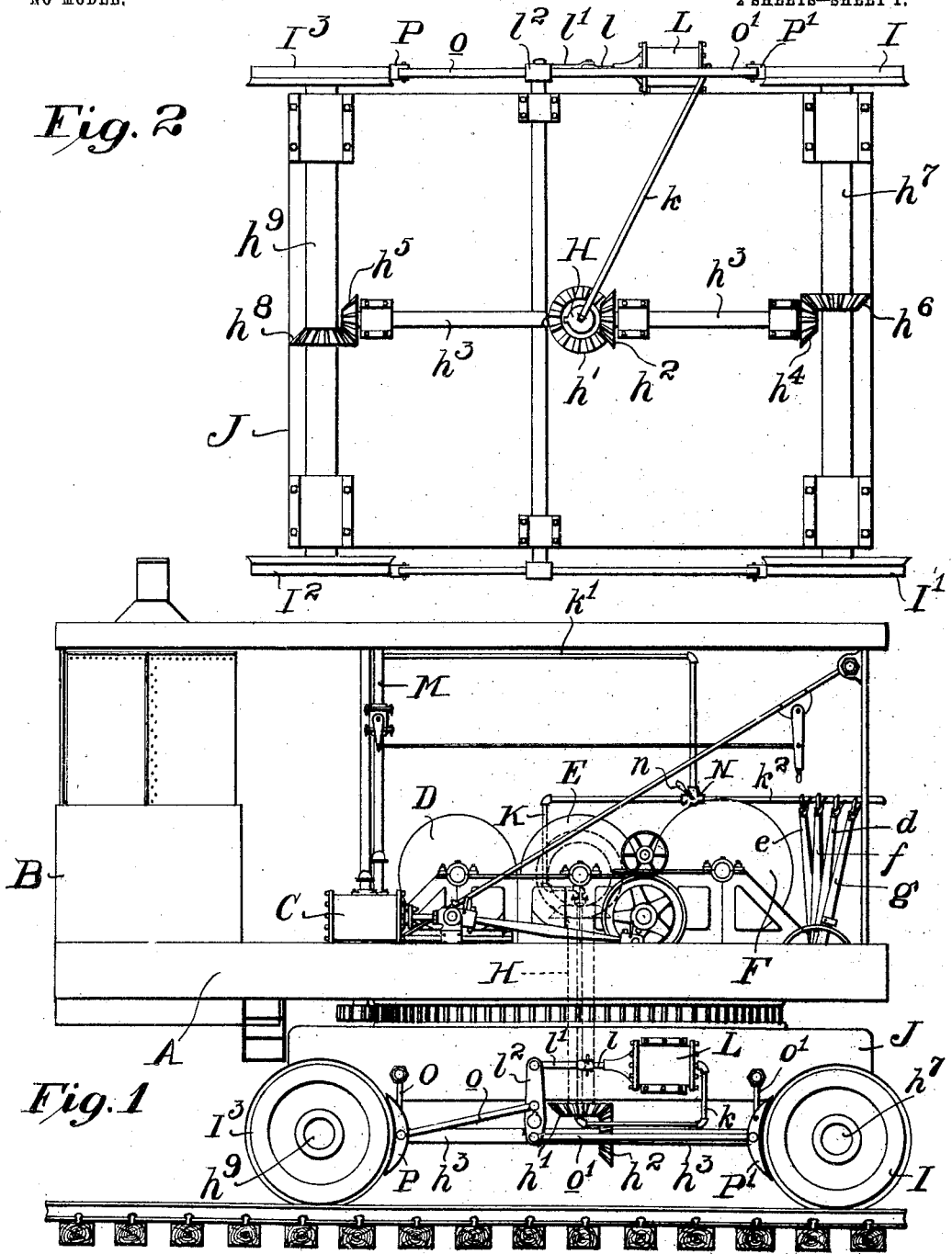

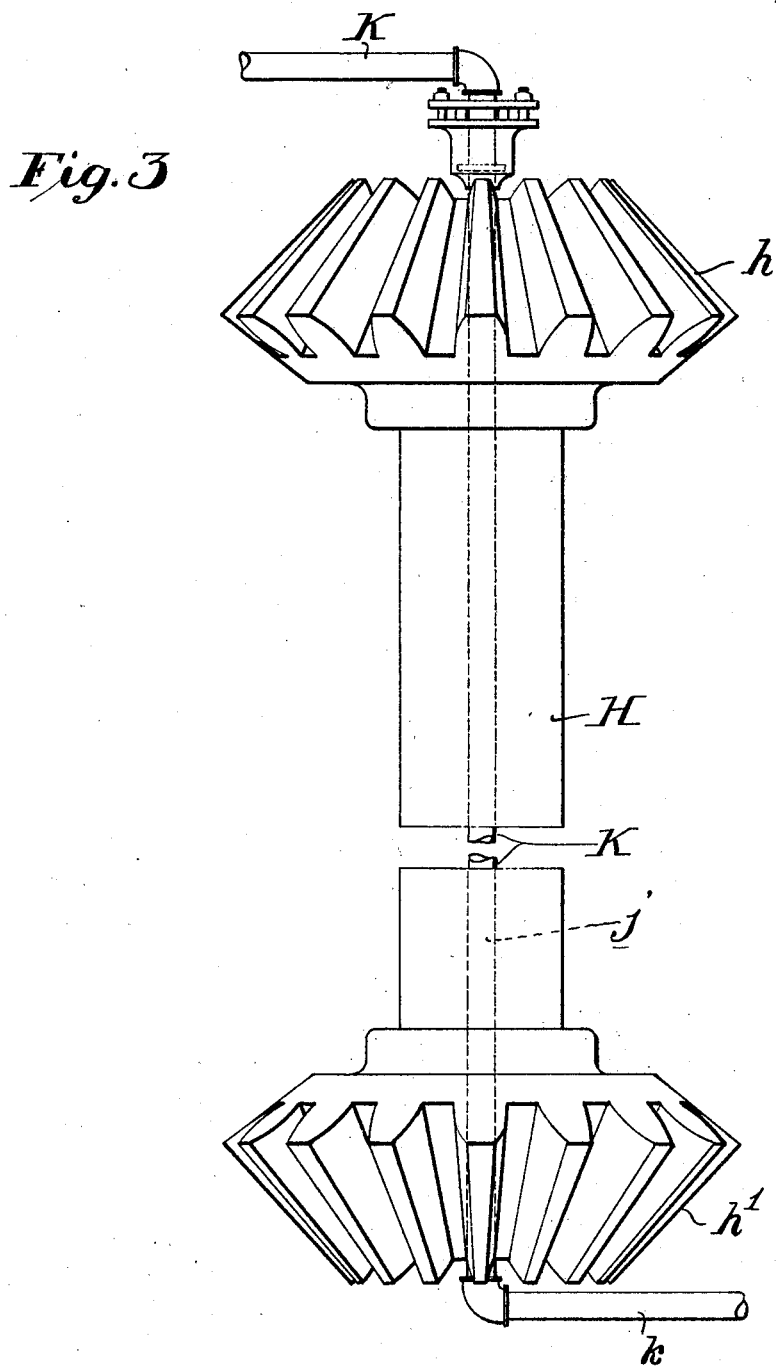

UNITED STATES PATENT OFFICE.

CHARLES H. TURVER, JR., OF HOLMESBURG, PENNSYLVANIA.

TRAVELING CRANE.

SPECIFICATION forming part of Letters Patent No. 765,405, dated July 19, 1904.

Application filed May 18, 1904. Serial No. 208,599. (No model.)

*To all whom it may concern:*

Be it known that I, CHARLES H. TURVER, Jr., a citizen of the United States, residing at Holmesburg, county of Philadelphia, and State of Pennsylvania, have invented a new and useful Improvement in Traveling Cranes, of which the following is a full, clear, and exact description, reference being had to the accompanying drawings, which form a part of this specification.

My invention relates to that class of cranes in which the crane is carried by a body or platform rotatably supported upon a truck or wheel-frame traveling upon rails or tracks.
The object of my invention is to provide means to regulate the speed of travel or stop the same by braking the wheels of the truck or frame. Heretofore the speed of travel has been obtained by braking the driving-drum upon the platform or body. In this class of machines the driving power is transmitted from the car-body to the truck or wheel-frame through a vertical shaft placed in the center of rotation of the body in the truck or car-frame.

In carrying out my invention I make an orifice centrally through this shaft, and through this orifice I carry a pipe in connection with driving-pressure supply. The lower end of the pipe I connect with a cylinder carried by the car truck or frame, in which cylinder is a piston connected to the brake-beams carrying the brake-shoes operating against the truck or frame wheels. Upon the pipe and on the body or platform I provide controlling means for admitting the pressure to and exhausting the same from the cylinder.

I will first describe the embodiment of my invention disclosed in the accompanying drawings and then point out the invention in the claims.

In the drawings, Figure 1 is a longitudinal elevation of a traveling crane embodying my invention. Fig. 2 is a plan view of the truck or wheel-frame and wheels. Fig. 3 is an enlarged view showing the power-transmitting shaft and gears and pressure-pipe.

A is the crane-platform, carrying the boiler B, the engine C, the drum D for swinging the crane, the driving-drum E, the lifting-drum F, the driving-drum-controlling lever $e$, the swinging-drum-controlling lever $d$, the lifting-drum-controlling lever $f$, and the drum brake-lever $g$ and their connections, all of the ordinary and well-known construction and mode of operation.

H is a vertical shaft having at its upper end the bevel-gear $h$ and at its lower end the bevel-gear $h'$. The gear $h$ is driven by the driving-drum. The gear $h'$ meshes with the gear $h^2$ on the shaft $h^3$, having at its ends the gears $h^4$ and $h^5$, the gear $h^4$ meshing with the gear $h^6$ on the axle $h^7$, carrying the wheels I I', and the gear $h^5$ meshes with the gear $h^8$ on the axle $h^9$, carrying the wheels $I^2$ $I^3$. The shaft H forms the center of rotation of the platform A upon the truck or wheel-frame J. This shaft H has the central vertical orifice through it. Through this orifice extends the pipe K. From the lower end of this pipe K extends a branch pipe $k$ to the cylinder L, carried by the wheel-frame or truck.

M is a pipe connecting the boiler B and engine C. From the pipe M a branch pipe $k'$ extends to the pipe K.
N is a valve having the operating-handle $n$, controlling the passage of steam to pipe K. From the valve N also extends a pipe $k^2$ to the air. The valve N can be turned to connect pipe K with the steam-pipe M or with pipe $k^2$. In the cylinder L is a piston having the piston-rod $l$, connected by link $l'$ to lever $l^2$. From this lever $l^2$ extend the rods $o$ and $o'$. The rod $o$ is connected to the brake-beam O, to which are pivotally connected the brake-shoes P. The rod $o'$ is connected to the brake-beam O', to which are pivotally connected the brake-shoes P'.

When the handle $n$ is operated to admit steam to the pipe K, and thus to cylinder L, the piston is operated, causing the piston-rod $l$, through the mechanism described, to operate the brake-beams and the brake-shoes. By regulating the amount of steam admitted the braking pressure may be regulated. By turning the valve so as to cut off steam from pipe K and open pipe K to the atmosphere through pipe $k^2$ the brake-shoes are released.

As may be seen, by providing the power-transmitting shaft H with a central orifice and passing the steam-pipe K therethrough the platform A may be rotated to any position without affecting the braking of the wheels.

Having now fully described my invention, what I claim, and desire to protect by Letters Patent, is—

1. In a traveling crane, provided with a platform carrying the crane and driving power, and a wheel-frame or truck upon which said platform is rotatably mounted, in combination, a vertical power-shaft, connecting the platform and wheel-frame, in the axis of rotation of the platform, said shaft having a central vertical orifice, a pipe, adapted to convey pressure, extending therethrough, a cylinder carried by the wheel-frame, a piston in said cylinder, a wheel-brake and connection between said piston and said brake, a source of pressure-supply carried by the platform and connection between said supply and said pipe.

2. In a traveling crane of the character described, in combination with the power-transmission shaft in the axis of rotation of the platform, provided with a central orifice, a pipe extending therethrough, a brake-cylinder carried by the wheel-frame and connection between the lower portion of said pipe and cylinder and between the upper portion of pipe and source of pressure-supply.

3. In a traveling crane of the character described, in combination with the power-transmission shaft in the axis of rotation of the platform, provided with a central orifice, a pipe extending therethrough, a brake-cylinder, carried by the wheel-frame, provided with a piston, connection between the lower portion of said pipe and cylinder and between the upper portion of pipe and source of pressure-supply, brake shoe or shoes, and connection between said brake shoe or shoes and the piston.

4. In a traveling crane of the character described, in combination with the power-transmission shaft in the axis of rotation of the platform, provided with a central orifice, a pipe extending therethrough, a brake-cylinder carried by the wheel-frame, provided with a piston, connection between the lower portion of said pipe and cylinder and between the upper portion of pipe and source of pressure-supply, and a connection between said pipe and the atmosphere, a valve on the platform controlling the connection between said pipe and the pressure-supply and atmosphere.

5. In a traveling crane of the character described, in combination with the power-transmission shaft in the axis of rotation of the platform, provided with a central orifice, a pipe extending therethrough, a brake-cylinder carried by the wheel-frame, provided with a piston, connection between the lower portion of said pipe and cylinder and between the upper portion of pipe and source of pressure-supply, brake shoe or shoes, and connection between said brake shoe or shoes and the piston, and communication between said pipe and the atmosphere, a valve on the platform controlling the connection between said pipe and the pressure-supply and atmosphere.

In testimony of which invention I have hereunto set my hand, at Holmesburg, Philadelphia, on this 25th day of April, 1904.

CHARLES H. TURVER, JR.

Witnesses:
MILTON P. CORBIN,
BENJ. W. SNYDER.